(12) United States Patent
Swierkocki

(10) Patent No.: US 12,129,038 B2
(45) Date of Patent: *Oct. 29, 2024

(54) LOW EMISSIVITY MATERIAL FOR INFLATABLE SAFETY PRODUCTS

(71) Applicant: Air Cruisers Company, LLC, Wall Township, NJ (US)

(72) Inventor: Thomas W. Swierkocki, Manasquan, NJ (US)

(73) Assignee: AIR CRUISERS COMPANY, LLC, Wall Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,841

(22) Filed: Dec. 22, 2022

(65) Prior Publication Data

US 2024/0208653 A1 Jun. 27, 2024

(51) Int. Cl.
*B64D 25/00* (2006.01)
*D06M 11/83* (2006.01)

(52) U.S. Cl.
CPC ............. *B64D 25/00* (2013.01); *D06M 11/83* (2013.01); *D10B 2505/12* (2013.01)

(58) Field of Classification Search
CPC ........ B64D 25/14; B64D 25/18; B64D 25/00; B29C 66/5221; B29C 65/18; B29C 66/73921; B29C 66/24221; B29C 66/439; B29C 66/54; B29C 66/133; B29C 66/729; B29C 66/0384; B29C 65/08; B29C 65/10; B29C 65/04; B29D 22/02; B29L 2031/3067; B29L 2031/5254; B29L 2031/3076; B29L 2031/485; B29L 2022/02; B63C 9/1255; B63C 9/04; B29K 2995/0067; C09J 7/21; C09J 7/35; C09J 2203/35; C09J 2301/12; C09J 2301/304; C09J 2400/163; C09J 2400/263; C09J 7/22; C09J 2301/16; D06M 17/04; D06M 2200/30; D06M 2200/35

See application file for complete search history.

(56) References Cited

U.S. PATENT DOCUMENTS

| 4,525,406 A | 6/1985 | Pollock | |
|---|---|---|---|
| 2005/0202213 A1 | 9/2005 | Yanai | |
| 2006/0165939 A1* | 7/2006 | Hottner | B32B 27/12 |
| | | | 156/304.3 |
| 2009/0220726 A1* | 9/2009 | Liggett | C09J 7/29 |
| | | | 428/411.1 |
| 2010/0266801 A1 | 10/2010 | Jahoda et al. | |

FOREIGN PATENT DOCUMENTS

| GB | 2448659 A | 10/2008 | |
|---|---|---|---|
| WO | WO-2021005083 A1 * | 1/2021 | ............ C09J 175/04 |
| WO | 2022039814 A2 | 2/2022 | |

OTHER PUBLICATIONS

International Application No. PCT/US2023/084686, International Search Report and Written Opinion mailed on Mar. 20, 2024, 10 pages.

* cited by examiner

*Primary Examiner* — Patricia L. Nordmeyer
(74) *Attorney, Agent, or Firm* — Kilpatrick Townsend & Stockton LLP

(57) ABSTRACT

Described is a fabric or flexible composite material for an inflatable safety product having an emissivity of less than or equal to 0.25. The fabric or flexible composite material may include a substrate defining a surface and a metallic layer covering at least one surface of the substrate.

19 Claims, 4 Drawing Sheets

LOW EMISSIVITY MATERIAL FOR INFLATABLE SAFETY PRODUCTS

FIELD OF THE INVENTION

The field of the invention relates to gas-holding, air-holding, seam tape, patch, accessory, and component materials, and, more particularly, to fabrics or flexible composite materials for an inflatable safety product.

BACKGROUND

Federal aviation safety regulations require aircraft to provide evacuation and other safety provisions for passengers. These include evacuation slides, evacuation slide/rafts, ramps, slide/ramps, life rafts, life vests, helicopter floats and other life-saving inflatable devices. Relevant inflatable products that can be improved using the fabrics or flexible composite materials of the present disclosure can include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air-holding functions or gas-holding functions. These inflatable devices are generally built from an assembly of inflatable tubular structures that form air beams that are sealed to one another. Inflatable escape slides and life rafts also have non-air-holding features, such as patches, floors, sliding surfaces, girts, handles, and other features.

Typically, in order to form the tubular structures, many pieces of fabric or flexible composite materials (which may be referred to herein as panels) are joined together. Safety regulations set strength requirements for the fabric or flexible composite materials itself (the field of the inflatable tube), as well as strength requirements for the seam areas. In certain embodiments, the tubular structures may be substantially leak proof when inflated to keep the inflation gas and air inside the tubes for long durations. The panels and/or the substrates can be heavy, which can make inflating safety provisions difficult and can increase the weight of a passenger vehicle on which the safety provisions are stored. Additionally, merely changing the substrate or panel material to reduce the weight may cause the safety provisions to no longer conform to various regulations, as discussed above.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a fabric or flexible composite material for an inflatable safety product has an emissivity of less than or equal to 0.48.

According to certain embodiments of the present invention, a fabric or flexible composite material for an inflatable safety product has an emissivity of less than or equal to 0.25.

According to certain embodiments of the present invention, a fabric or flexible composite material for an inflatable safety product includes a substrate and a metallic layer covering at least one surface of the substrate.

According to certain embodiments of the present invention, a fabric or flexible composite material for an inflatable safety product includes a substrate defining a surface and a metallic layer covering the surface of the fabric or flexible composite material, wherein the metallic layer is an outermost layer of the fabric or flexible composite material.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
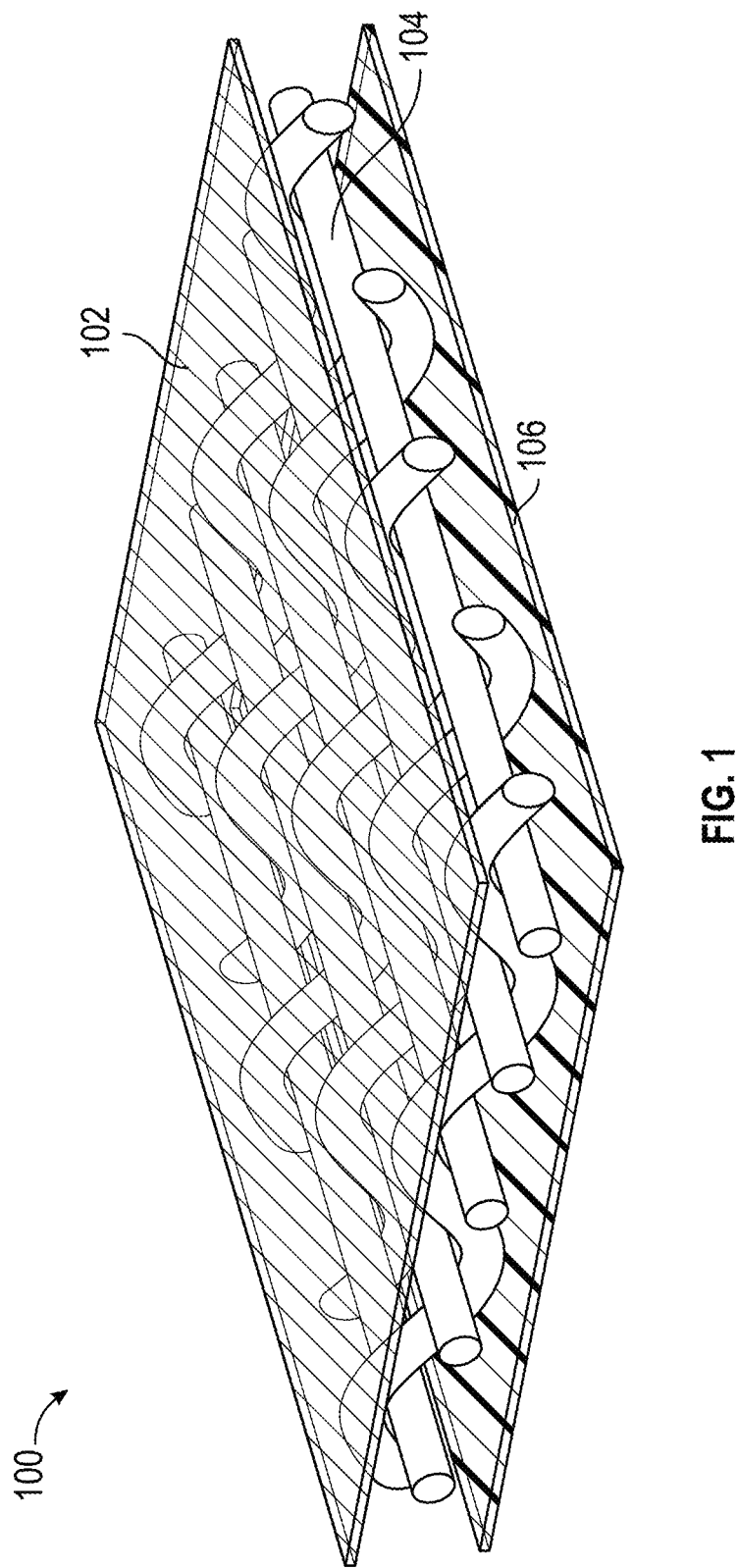
FIG. 1 is a cross-sectional view of a fabric or flexible composite material with an outer surface with dispersed metallic particles for an inflatable safety product, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Described herein are low emissivity materials for inflatable safety products. While the low emissivity materials are discussed for use with inflatable safety products such as slides, rafts, and ramps, they are by no means so limited.

Rather, embodiments of the low emissivity materials may be used in fabric or flexible composite material related applications of any type of inflatable safety product or otherwise as desired.

Inflatable safety products such as inflatable evacuation slides, slide/rafts, ramps, and slide/ramps traditionally utilize a fabric or flexible composite material with a polyamide substrate such as Nylon 6,6 and thermoplastic polyurethane coatings. The thermoplastic polyurethane coatings are applied to the polyamide substrate to provide abrasion resistance and gas barrier properties.

Polyamide substrates have a relatively high melting point (e.g., about 514° F.) making them suitable for exposure to radiant heat during a fire. To provide additional radiant heat resistance during a fire (e.g., a fire on an aircraft or other vehicle), aluminum particles are dispersed within the thermoplastic polyurethane coating that is applied to the outside surfaces of the polyamide substrate. Dispersing the aluminum particles within the thermoplastic polyurethane coating traditionally results in the fabric or flexible composite material possessing an emissivity of about 0.72. While the thermoplastic polyurethane coating provides some radiant heat resistance, the higher melting point of the polyamide substrate allows for the fabric to maintain its structural integrity. However, fabrics or flexible composite materials utilizing polyamide substrates and thermoplastic polyurethane coatings are generally heavy and or bulky, thereby taking up weight on vehicles with weight restrictions such as aircraft.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

Other types of materials that may have a lower weight have traditionally been avoided for the substrate due to lower melting temperatures of such materials, and such fabrics or flexible composite material would melt even with the thermoplastic polyurethane coating. As an example, polyethylene substrates such as but not limited to ultra-high molecular weight polyethylene (UHMWPE) have been avoided for inflatable safety products due to a significantly lower melting point (about 297° F.) compared to polyamide substrates, and the heat absorbed would cause the polyethylene substrates to melt.

Described herein are fabric or flexible composite materials for an inflatable safety product that have an emissivity of less than or equal to 0.48, such as less than or equal to 0.25. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed.

In various embodiments, the fabric or flexible composite materials described herein include a substrate with a metallic layer covering at least one surface of the substrate, and the metallic layer on the substrate may provide the emissivity of less than or equal to 0.48, such as less than or equal to 0.25. Applying a metallic layer to the at least one surface of a fabric or flexible composite material may limit the temperature of the substrate and gas barrier when exposed to radiant heat. In other words, the lower emissivity of less than or equal to 0.48, such as less than or equal to 0.25 may reflect more and/or most heat compared to traditional thermoplastic coatings, thereby limiting the temperature of the substrate and gas barrier. Limiting the temperature may maintain the mechanical and gas holding properties of the fabric or flexible composite material with a polyethylene substrate when the fabric or flexible composite material is exposed to radiant heat during an aircraft fire. Such improved (lower) emissivity in turn allows for lighter weight fabrics or flexible composite materials to be utilized, thereby providing weight savings. As a non-limiting example, a polyethylene substrate such as but not limited to an UHMWPE substrate may be utilized as the substrate.

Various other advantages and benefits may be realized with the systems and methods described herein, and the aforementioned benefits should not be considered limiting.

Turning now to the figures, FIG. 1 is a cross sectional view of a fabric or flexible composite material 100 for an inflatable safety product according to embodiments and with an emissivity of less than or equal to 0.25. Stated differently, when subjected to radiative heat, the fabric or flexible composite material 100 may reflect at least 75% of the heat. The fabric or flexible composite material 100 may include various types of materials, optionally with different functionalities. As non-limiting examples, the fabric or flexible composite material 100 may include or be a gas-holding fabric or flexible composite material, a floor fabric or flexible composite material, a sliding surface fabric or flexible composite material, a girt fabric or flexible composite material, a patch fabric or flexible composite material, an accessory fabric or flexible composite material, a component fabric or flexible composite material, a seam tape fabric or flexible composite material, or the like. In certain embodiments, the fabric or flexible composite material 100 may be or may include material with a weight of less than or approximately 8 ounces/yd$^2$. In some embodiments, the weight of the fabric or flexible composite material 100 is less than or approximately 6 ounces/yd$^2$. In some embodiments, the weight of the fabric or flexible composite material 100 is less than or approximately 5 ounces/yd$^2$. In some embodiments, the weight of the fabric or flexible composite material 100 is less than or approximately 4 ounces/yd$^2$. In some embodiments, the weight of the fabric or flexible composite material 100 is less than or approximately 2 ounces/yd$^2$. In some embodiments, the weight of the fabric or flexible composite material 100 is less than or approximately 1 ounce/yd$^2$. Non-limiting examples of inflatable safety products with the fabric or flexible composite material 100 include, but are not limited to, an inflatable evacuation slide, inflatable slide/raft, inflatable ramp, inflatable slide/ramp, an inflatable life raft, an inflatable helicopter float, and/or an inflatable life vest, among others.

The fabric or flexible composite material 100 generally includes a substrate 104 and a metallic layer 102. An intermediate adhesive layer and/or film layer optionally may be provided between the substrate 104 and the metallic layer 102. The substrate 104 may define opposing surfaces, and in certain embodiments the metallic layer 102 covers at least one surface of the substrate 104. An adhesive layer and/or film layer optionally may be provided between the substrate 104 and the metallic layer 102. As discussed in detail below, the metallic layer 102 may be completely covering the at least one surface of the substrate 104. Optionally, at least a portion of the substrate 104 is not covered by the metallic layer 102. Optionally, the metallic layer 102 may be discontinuously covering the substrate 104 and provided at discrete locations covering the substrate 104.

The substrate 104 may include various different materials or combinations of materials. As non-limiting examples, the substrate 104 may include polyethylene, UHMWPE, polypropylene, polyester, polyamide, aromatic polyamide, aramid, polyolefin, aromatic polyester, polyarylate, other liquid crystal polymers, or nylon, or other suitable substrate material, or any combination thereof, or any appropriate materials. As additional non-limiting examples, the substrate 104 may be a material such as but not limited to those sold under the trade names Dyneema®, Spectra®, Innegra®, Vectran®, Nylon-6, or Nylon 6-6.

In certain embodiments, substrate 104 may have a weight of less than or approximately 4.5 ounces/yd$^2$, such as less than or approximately 3.5 ounces/yd$^2$, such as less than or approximately 3.0 ounces/yd$^2$, such as less than or approximately 2.5 ounces/yd$^2$, such as less than or approximately 2.0 ounces/yd$^2$, such as less than or approximately 1.5 ounces/yd$^2$, such as less than or approximately 1.0 ounce/yd$^2$, such as less than or approximately 0.5 ounces/yd$^2$. Optionally, the substrate 104 is a material having a melting temperature less than that of a polyamide substrate, such as a material having a melting temperature less than 500° F., such as a melting temperature less than 450° F., such as a melting temperature less than 400° F., such as a melting temperature less than 350° F., such a melting temperature less than 300° F. In one non-limiting example, the substrate 104 is a polyethylene substrate, such as but not limited to an UHMWPE substrate.

The metallic layer 102 may include various metals or metallic elements as desired, including but not limited to aluminum, aluminum alloys, titanium, titanium alloys, nickel, nickel alloys brass, brass alloys, steel, steel alloys, stainless steel, stainless steel alloy, silver, silver alloy, combinations thereof, and/or any other suitable metal or metallic elements as desired. The metallic layer 102 optionally may be a continuous layer of the fabric or flexible composite material 102, meaning that the portions of the metallic layer 102 are interconnected even though an entirety of the at least one surface of the substrate 104 is not necessarily covered.

The metallic layer 102 may be deposited, adhered, and/or otherwise positioned to cover at least one surface of the substrate 104 (or intermediate adhesive layer and/or film layer) using various techniques as desired. As a non-limiting example, the metallic layer 102 may be printed on the substrate 104 or intermediate adhesive layer and/or film layer, may be adhered to the substrate 104 or intermediate adhesive layer and/or film layer via epoxies or other adhering materials, may be vapor-deposited on the substrate 104 or intermediate adhesive layer and/or film layer, or the like. In some embodiments, the metallic layer 102 is plated on the substrate 104 or intermediate adhesive layer and/or film layer, sputtered on the substrate 104 or intermediate adhesive layer and/or film layer, or the like. In some embodiments, the metallic layer 102 is positioned on the substrate 104, on other components of the fabric or flexible composite material 100, or on the fabric or flexible composite material 100 itself. In various embodiments, a metallic foil layer is adhered to the substrate 104 or intermediate adhesive layer and/or film layer.

In some embodiments, the metallic layer 102 may form an outer-most layer of the fabric or flexible composite material 100. However, in other embodiments, it need not be, and the metallic layer 102 may be covered by an exterior layer (and the exterior layer is an outer-most layer). When included, the exterior layer may be various types of materials as desired, and in certain embodiments the exterior layer may protect the metallic layer 102. In one non-limiting example, the exterior layer may be an acrylic coating, although in other embodiments other suitable materials may be utilized as desired. Optionally, and when included, the exterior layer may include a thin film layer or other suitable layer that may minimize and/or prevent damage, oxidation, and/or corrosion of the metallic layer 102. In some embodiments, the exterior layer optionally includes a passivation layer, a parkerized layer, or other suitable layer that may be formed via a controlled oxidation process. In another embodiment, the exterior layer may minimize or prevent deterioration of the fabric or flexible composite material due to hydrolysis.

Optionally, the fabric or flexible composite material 100 includes an inner layer 106. In some embodiments, the metallic layer 102 may be provided on a first surface (e.g., an upper and/or outer surface) of the substrate 104, and the inner layer 106 may be provided on a second surface (e.g., a lower and/or inner surface) of the substrate 104. When included, the inner layer 106 may provide an air-tight or gas-tight seal for the fabric or flexible composite material 100. The inner layer 106 may be constructed from various materials or combinations of materials as desired. As non-limiting examples, the inner layer 106 may be a plastic-based layer, a urethane-based layer, a metallic layer, combinations thereof, and/or any other suitable layer that can be positioned on the second surface of the substrate 104 for allowing the fabric or flexible composite material 100 to be inflated with air or other gases.

As mentioned, the fabric or flexible composite material 100 has an improved emissivity compared to traditional materials. In various aspects, the metallic layer 102 reduces the emissivity of the fabric or flexible composite material 100 to less than or equal to 0.48, such as less than or equal to 0.25. In a non-limiting example, for substrates with a higher melting temperature than polyethylene, an emissivity of 0.48 or lower is sufficient, and substrates with a melting temperature like polyethylene or lower may include an emissivity of 0.25 or less. The reduced emissivity in turn limits the temperature that the substrate 104 and inner layer 106 are heated to when the fabric or flexible composite material 100 is exposed to radiant heat. As a non-limiting example, the substrate 104 may be an UHMWPE substrate, and the metallic layer 102 may limit the temperature the UHMWPE substrate to about 199° F., or about 98° F. less than the melting temperature of the UHMWPE substrate.

Figure 2:
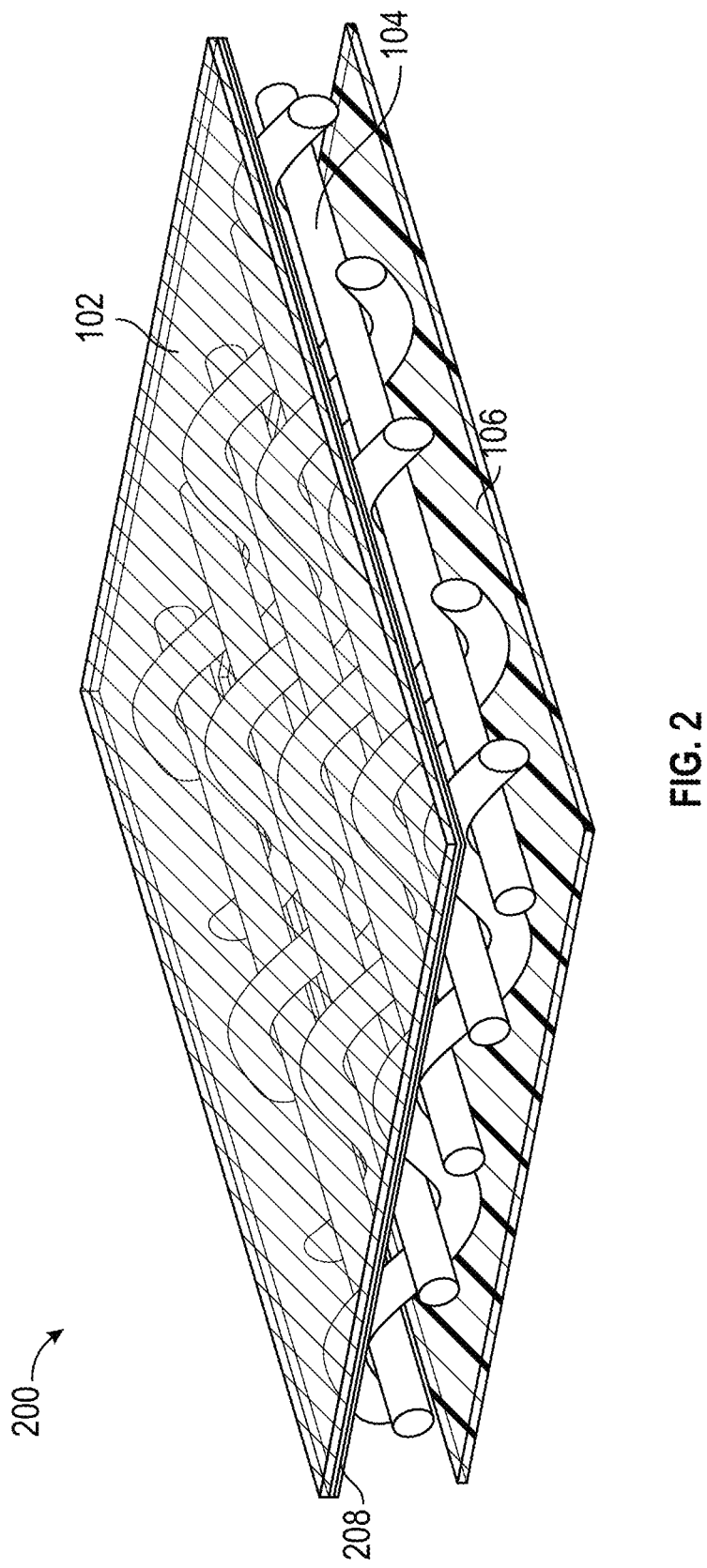
FIG. 2 is a cross-sectional view of a fabric or flexible composite material with a continuous metallic layer, for an inflatable safety product according to certain embodiments of the present invention.
Figure 4:
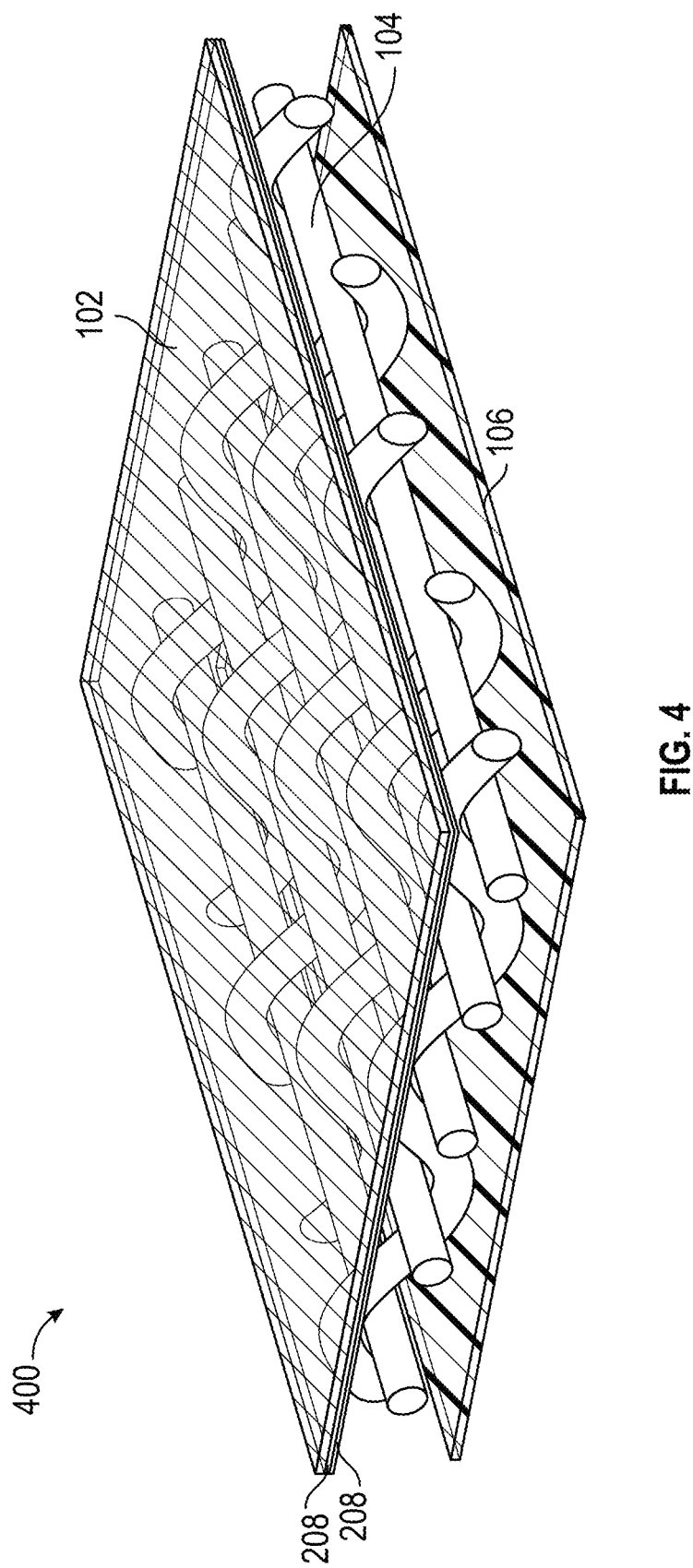
FIG. 4 is a cross-sectional view of a or flexible composite material fabric, with a completely covering metallic layer for an inflatable safety product and that includes a substrate with an adhesive layer and a film layer that the metallic layer is covering according to certain embodiments of the present invention.

FIGS. 2 and 4 illustrate other examples of a fabric or flexible composite materials with intermediate adhesive layers and/or film layers according to embodiments. The number of intermediate adhesive layers and/or film layers illustrated in FIGS. 2 and 4 is for illustrative purposes only and should not be considered limiting. In various embodiments, a fabric or flexible composite material according to embodiments may include an adhesive layer, a film layer, or both an adhesive layer and a film layer.

In FIG. 2, a flexible composite material 200 for an inflatable safety product is substantially similar to the fabric or flexible composite material 100 except that the fabric or flexible composite material additionally includes a layer 208 between the metallic layer 102 and the substrate 104. The layer 208 in FIG. 2 may be an adhesive layer and/or film, and when included, may facilitate adhering of the metallic layer 102 to the substrate 104. As a non-limiting example, the layer 208 may be deposited on, attached to, or otherwise positioned on the substrate 104, and the metallic layer 102 may be deposited on, plated on, sputtered on, attached to, or otherwise positioned on the intermediate layer 208. In various embodiments, the film layer may be acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any appropriate materials In FIG. 4, a flexible composite material 400 for an inflatable safety product is substantially similar to the fabric or flexible composite material 200 except that the fabric or flexible composite material 400 includes two layers 208 between the metallic layer 102 and the substrate 104. In FIG. 4, each layer 208 may be an adhesive layer, a film layer, or both. The layers 208 in FIG. 4 may facilitate adhering of the metallic layer 102 to the substrate 104.

Figure 3:
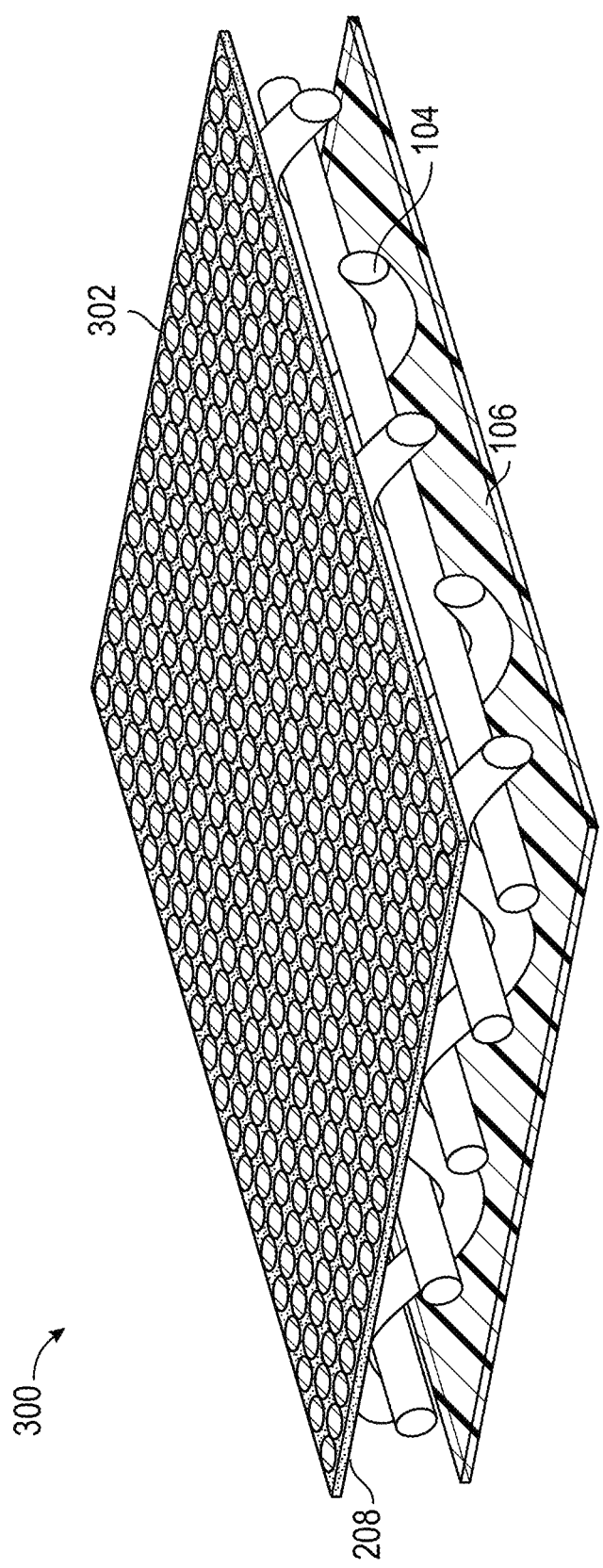
FIG. 3 is a cross-sectional view of a fabric or flexible composite material with a selectively printed metallic surface layer for an inflatable safety product according to certain embodiments of the present invention.

FIG. 3 illustrates another example of a fabric or flexible composite material 300 for an inflatable safety product according to embodiments. The fabric or flexible composite material 300 is substantially similar to the fabric or flexible composite material 100 except that, whereas the metallic layer 102 is a connected surface and substantially covers the substrate 104 or layer(s) 208, the metallic layer 302 of the fabric or flexible composite material 300 does not completely cover the substrate 102 or layer(s) 208. The metallic layer 302 may be completely covering or discontinuous on the substrate 104 or layer(s) 208 as desired.

In various embodiments, and as illustrated, the metallic layer 302 may be provided as a discrete pattern on the substrate 104 or layer(s) 208. In other embodiments, the metallic layer 302 need not form a pattern, and/or the metallic layer 302 may be provided as a plurality of discrete patterns (that may be connected with each other and/or disconnected). The uncovered portions of the substrate 104 or layer(s) 208 of the fabric or flexible composite material 300 may allow for an adhesive and/or other material to be provided and directly engage the substrate 202 or layer(s) 208 (e.g., when joining two fabrics or flexible composite materials and/or a component) while maintaining the improved performance of the metallic layer 302.

In addition to reducing the emissivity of the fabric or flexible composite material 100, the metallic layer 102 may enhance other properties of the fabric or flexible composite material 100. The fabric or flexible composite material 100 may be a light-weight material for an inflatable safety product compared to traditional materials. The fabric or flexible composite material 100 may have improved abrasion resistance compared to traditional materials for inflatable safety products. In certain embodiments, the fabric or flexible composite material 100 with the lower emissivity may maintain the mechanical and/or gas-holding properties of the fabric or flexible composite material 100 when the fabric or flexible composite material 100 is exposed to radiant heat during an aircraft fire. The fabric or flexible composite material 100 described herein may be used as a seam tape, and the seam tape may maintain adhesion and/or gas-holding properties of the seam tape when exposed to radiant heat during an aircraft fire without requiring a reflective paint coating on the seam tape (as traditionally required for seam tapes). The fabric or flexible composite material 100 described herein may be used for a patch, accessory, or component, and the patch, accessory, or component may maintain adhesion and/or gas-holding properties when exposed to radiant heat during an aircraft fire without requiring a reflective paint coating on the patch, accessory, or component (as traditionally required for patches, accessories, or components).

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging Seam Adhesion TSO-C69c Requirement As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 180° angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear

TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.
Tensile and Tear Strength
TSO-C69c Requirement As a non-limiting example, the fabric or flexible composite material of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).
Air Holding & Gas Holding
TSO-C69c Requirement As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.
Helium Permeability
TSO-C69c Requirement As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.
Temperature Resistance
TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.
Radiant Heat Resistance
TSO-C69c Requirement As a further non-limiting example, the fabric or flexible composite material described herein when exposed to a radiant heat flux of 1.5 Btu/ft²-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure
TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis
TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation
TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging
TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability
TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A fabric or flexible composite material for an inflatable safety product, the fabric or flexible composite material having an emissivity of less than or equal to 0.25.

Example 2. The fabric or flexible composite material of any of the preceding or subsequent examples or combination of examples, wherein the fabric or flexible composite material comprises: a substrate defining a surface; and a metallic layer covering at least one surface of the substrate.

Example 3. The fabric or flexible composite material of any of the preceding or subsequent examples or combination of examples, wherein the substrate comprises polyethylene, UHMWPE, polypropylene, polyester, polyamide, aromatic polyamide, aramid, polyolefin, aromatic polyester, polyarylate, other liquid crystal polymers, or nylon.

Example 4. The fabric or flexible composite material of any of the preceding or subsequent examples or combination of examples, wherein the metallic layer is a completely covering layer.

Example 5. The fabric or flexible composite material of any of the preceding or subsequent examples or combination of examples, wherein at least a portion of the substrate is not covered by the metallic layer.

Example 6. The fabric or flexible composite material of any of the preceding or subsequent examples or combination of examples, wherein the metallic layer is provided as a pattern on at least one surface of the substrate, adhered to the substrate by the adhesive layer.

Example 7. The fabric or flexible composite material of any of the preceding or subsequent examples or combination of examples, wherein the metallic layer comprises aluminum, an aluminum alloy, nickel, a nickel alloy, brass, a brass alloy, steel, a steel alloy, stainless steel, a stainless steel alloy, silver, silver alloy, combinations thereof, or any other suitable metal or metallic alloy.

Example 8. The fabric or flexible composite material of any of the preceding or subsequent examples or combination of examples, wherein the metallic layer is printed on the fabric or flexible composite material, adhered to the fabric or flexible composite material, vapor deposited on the fabric or flexible composite material, a metallic foil layer on the fabric or flexible composite material, a plated metallic layer on the fabric or flexible composite material, or a sputter deposited metallic layer on the fabric or flexible composite material.

Example 9. The fabric or flexible composite material of any of the preceding or subsequent examples or combination of examples, wherein the metallic layer is an outermost layer of the fabric or flexible composite material.

Example 10. The fabric or flexible composite material of any of the preceding or subsequent examples or combination of examples, further comprising an adhesive layer and/or a film layer between the substrate and a metallic layer.

Example 11. The fabric or flexible composite material of any of the preceding or subsequent examples or combination of examples, wherein the metallic layer is covered by an exterior layer to prevent damage, oxidation, and/or corrosion of the metallic layer.

Example 12. The fabric or flexible composite material of any of the preceding or subsequent examples or combination of examples, wherein the metallic layer is covered by an exterior layer to prevent deterioration of the fabric or flexible composite material due to hydrolysis.

Example 13. The fabric or flexible composite material of any of the preceding or subsequent examples or combination of examples, wherein the metallic layer is covered by an exterior layer to promote adhesion to the metallic layer.

Example 14. The fabric or flexible composite material of any of the preceding or subsequent examples or combination of examples, wherein the metallic layer is covered by an exterior layer to improve the durability of the metallic layer.

Example 15. The fabric or flexible composite material of any of the preceding or subsequent examples or combination of examples, wherein the fabric or flexible composite material comprises a substrate, the substrate comprising a material with a melting point less than a polyamide substrate.

Example 16. The fabric or flexible composite material of any of the preceding or subsequent examples or combination of examples, wherein the substrate comprises a material with a melting point less than 300° F.

Example 17. The fabric or flexible composite material of any of the preceding or subsequent examples or combination of examples, wherein the substrate comprises a material with a melting point less than 400° F.

Example 18. The fabric or flexible composite material of any of the preceding or subsequent examples or combination of examples, wherein the fabric or flexible composite material is a gas-holding fabric or flexible composite material, floor fabric or flexible composite material, a sliding surface fabric or flexible composite material, a girt fabric or flexible composite material, patch fabric or flexible composite material, an accessory fabric or flexible composite material, a component fabric or flexible composite material, or a seam tape fabric or flexible composite material.

Example 19. An inflatable safety product comprising the fabric or flexible composite material of claim 1 as a panel or as a seam tape.

Example 20. The inflatable safety product of any of the preceding or subsequent examples or combination of examples, wherein the inflatable safety product comprises an inflatable evacuation slide, an inflatable evacuation slide/raft, an inflatable evacuation ramp, an inflatable evacuation slide/ramp, an inflatable life raft, an inflatable helicopter float, or an inflatable life vest.

Example 21. A fabric or flexible composite material for an inflatable safety product, the fabric or flexible composite material comprising: a substrate; and a metallic layer covering at least one surface of the substrate.

Example 22. The fabric or flexible composite material of any of the preceding or subsequent examples or combination of examples, wherein: the metallic layer is a completely covering metallic layer; an adhesive layer and/or a film layer is between the metallic layer and the substrate; and the substrate is selected from the group consisting of a polyethylene substrate, an UHMWPE substrate, a polypropylene substrate, a polyester substrate, a polyamide substrate, an aromatic polyamide substrate, an aramid substrate, a polyolefin substrate, an aromatic polyester substrate, a polyarylate substrate, another liquid crystal polymers substrate, or a nylon substrate.

Example 23. The fabric or flexible composite material of any of the preceding or subsequent examples or combination of examples, wherein at least a portion of the surface of the fabric or flexible composite material is not covered by the metallic layer.

Example 24. A fabric or flexible composite material for an inflatable safety product, the fabric or flexible composite material comprising: a substrate defining a surface; and a metallic layer covering the surface of the fabric or flexible composite material, wherein the metallic layer is an outermost layer of the fabric or flexible composite material.

Example 25. The fabric or flexible composite material of any of the preceding or subsequent examples or combination of examples, wherein: the substrate comprises polyethylene, UHMWPE, polypropylene, polyester, polyamide, aromatic polyamide, aramid, polyolefin, aromatic polyester, polyarylate, other liquid crystal polymers, or nylon; the metallic layer is a completely covering layer and comprises aluminum, an aluminum alloy, nickel, a nickel alloy, brass, a brass alloy, steel, a steel alloy, stainless steel, a stainless steel alloy, silver, silver alloy, combinations thereof, or any other suitable metal or metallic alloy; and an adhesive layer and/or a film layer is between the metallic layer and the substrate.

Example 26. A fabric or flexible composite material for an inflatable safety product, the fabric or flexible composite material having an emissivity of less than or equal to 0.48.

Example 27. The fabric or flexible composite material of any of the preceding or subsequent examples or combination of examples wherein the fabric or flexible composite material comprises: a substrate defining a surface; and a metallic layer covering at least one surface of the substrate.

Example 28. The fabric or flexible composite material of claim 27, wherein the substrate comprises polyethylene, UHMWPE, polypropylene, polyester, polyamide, aromatic polyamide, aramid, polyolefin, aromatic polyester, polyarylate, other liquid crystal polymers, or nylon.

Example 29. The fabric or flexible composite material of any of the preceding or subsequent examples or combination of examples, wherein the metallic layer is a completely covering layer.

Example 30. The fabric or flexible composite material of any of the preceding or subsequent examples or combination of examples, wherein at least a portion of the substrate is not covered by the metallic layer.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. A fabric or flexible composite material for an inflatable safety product, the fabric or flexible composite material comprising:
    a substrate having a weight less than or equal to 4.5 ounces/yd$^2$ and a melting temperature less than 500° F., the substrate comprising polyethylene or ultra-high molecular weight polyethylene; and
    a metallic layer provided on at least one surface of the substrate and such that the fabric or flexible composite material comprises an emissivity of less than or equal to 0.48, wherein the metallic layer is an outermost layer of the fabric or flexible composite material; and
    an interior layer on a second surface of the substrate opposite the at least one surface, wherein the interior layer is an air-tight layer.

2. The fabric or flexible composite material of claim 1, wherein the metallic layer covers an entirety of the at least one surface.

3. The fabric or flexible composite material of claim 1, wherein at least a portion of the at least one surface of the substrate is not covered by the metallic layer.

4. A fabric or flexible composite material for an inflatable safety product, the fabric or flexible composite material comprising:
    a substrate having a weight less than or equal to 4.5 ounces/yd$^2$ and a melting temperature less than 500° F., the substrate comprising polyethylene or ultra-high molecular weight polyethylene;
    a metallic layer provided on at least one surface of the substrate and such that the fabric or flexible composite material comprises an emissivity of less than or equal to 0.25;
    an exterior layer that covers the metallic layer, wherein the exterior layer is an outermost layer of the fabric or flexible composite material; and
    an interior layer on a second surface of the substrate opposite the at least one surface, wherein the interior layer is an air-tight layer.

5. The fabric or flexible composite material of claim 4, wherein the metallic layer is a completely covering layer.

6. The fabric or flexible composite material of claim 4, wherein at least a portion of the substrate is not covered by the metallic layer.

7. The fabric or flexible composite material of claim 4, wherein the metallic layer is provided as a pattern on at least one surface of the substrate, adhered to the substrate by an adhesive layer.

8. The fabric or flexible composite material of claim 4, wherein the metallic layer comprises aluminum, an aluminum alloy, nickel, a nickel alloy, brass, a brass alloy, steel, a steel alloy, stainless steel, a stainless steel alloy, silver, silver alloy, or combinations thereof.

9. The fabric or flexible composite material of claim 4, wherein the metallic layer is printed on the fabric or flexible composite material, adhered to the fabric or flexible composite material, vapor deposited on the fabric or flexible composite material, a metallic foil layer on the fabric or flexible composite material, a plated metallic layer on the fabric or flexible composite material, or a sputter deposited metallic layer on the fabric or flexible composite material.

10. The fabric or flexible composite material of claim 4 further comprising an adhesive layer and/or a film layer between the substrate and a metallic layer.

11. The fabric or flexible composite material of claim 4, wherein the exterior layer is configured to prevent damage, oxidation, and/or corrosion of the metallic layer.

12. The fabric or flexible composite material of claim 4, wherein the exterior layer is configured to prevent deterioration of the fabric or flexible composite material due to hydrolysis.

13. The fabric or flexible composite material of claim 4, wherein the exterior layer is configured to promote adhesion to the metallic layer.

14. The fabric or flexible composite material of claim 4, wherein the exterior layer is configured to improve durability of the metallic layer.

15. The fabric or flexible composite material of claim 4, wherein the substrate comprises a material with a melting point less than 300° F.

16. The fabric or flexible composite material of claim 4, wherein the substrate comprises a material with a melting point less than 400° F.

17. The fabric or flexible composite material of claim 4, wherein the fabric or flexible composite material is a gas-holding fabric or flexible composite material, floor fabric or flexible composite material, a sliding surface fabric or flexible composite material, a girt fabric or flexible composite material, patch fabric or flexible composite material, an accessory fabric or flexible composite material, a component fabric or flexible composite material, or a seam tape fabric or flexible composite material.

18. An inflatable safety product comprising the fabric or flexible composite material of claim 4 as a panel or as a seam tape, wherein the inflatable safety product is configured to be rapidly inflated from a deflated and folded configuration during a deployment event.

19. The inflatable safety product of claim 18, wherein the inflatable safety product comprises an inflatable evacuation slide, an inflatable evacuation slide/raft, an inflatable evacuation ramp, an inflatable evacuation slide/ramp, an inflatable life raft, an inflatable helicopter float, or an inflatable life vest.

* * * * *